US008456584B2

(12) United States Patent
Koo

(10) Patent No.: US 8,456,584 B2
(45) Date of Patent: Jun. 4, 2013

(54) LIQUID CRYSTAL DISPLAY DEVICE

(75) Inventor: Hyung-Mo Koo, Seoul (KR)

(73) Assignee: LG Display Co. Ltd., Seoul (KR)

( * ) Notice: Subject to any disclaimer, the term of this patent is extended or adjusted under 35 U.S.C. 154(b) by 504 days.

(21) Appl. No.: 12/644,930

(22) Filed: Dec. 22, 2009

(65) Prior Publication Data

US 2010/0277663 A1  Nov. 4, 2010

(30) Foreign Application Priority Data

May 4, 2009  (KR) .......................... 10-2009-0038935

(51) Int. Cl.
*G02F 1/1333*  (2006.01)

(52) U.S. Cl.
USPC ............... 349/40; 349/151; 349/58; 349/152; 349/187; 257/72; 345/173

(58) Field of Classification Search
USPC .......................... 349/12, 40, 58, 151; 345/173
See application file for complete search history.

(56) References Cited

U.S. PATENT DOCUMENTS

| 6,525,786 B1 * | 2/2003 | Ono ................................ 349/40 |
| 2003/0223249 A1 * | 12/2003 | Lee et al. ...................... 362/561 |
| 2004/0160422 A1 * | 8/2004 | Choi et al. ..................... 345/173 |
| 2007/0132921 A1 * | 6/2007 | Yoon .............................. 349/107 |
| 2008/0137020 A1 * | 6/2008 | Takahashi et al. ............. 349/150 |
| 2008/0309865 A1 * | 12/2008 | Sugita et al. ................... 349/150 |
| 2009/0033825 A1 * | 2/2009 | Fukayama et al. .............. 349/58 |
| 2009/0086124 A1 * | 4/2009 | Oohira ............................. 349/60 |
| 2009/0310055 A1 * | 12/2009 | Kim et al. ........................ 349/58 |

* cited by examiner

*Primary Examiner* — Edward J Glick
*Assistant Examiner* — Sang V Nguyen
(74) *Attorney, Agent, or Firm* — Brinks Hofer Gilson & Lione

(57) ABSTRACT

A liquid crystal display device strengthens an adhesive force of an electrostatic prevention means without increasing a thickness of the liquid crystal display device by bending part of the bottom cover thereof into a "C"-shape, thereby securing a space for adhering an upper indium tin oxide (ITO) of the color filter substrate and the electrostatic prevention means, in a small-sized model having an in-plane switching (IPS) mode liquid crystal panel, and the liquid crystal display device may include a liquid crystal panel configured with a color filter substrate and an array substrate to display an image; a backlight assembly provided at a rear surface of the liquid crystal panel to supply light to the liquid crystal panel; a support main for accommodating and fixing the liquid crystal panel and the backlight assembly; a bottom cover fastened to the support main to include at least one bending portion in which part thereof is bent in a "C"-shape; and a electrostatic prevention means adhered to cover part of an upper ITO of the liquid crystal panel including the bending portion of the bottom cover.

5 Claims, 6 Drawing Sheets

LIQUID CRYSTAL DISPLAY DEVICE

This application claims the benefit of Korea Patent Application No. 10-2009-0038935, filed on May 4, 2009, the entire contents of which is incorporated herein by reference for all purposes as if fully set forth herein.

BACKGROUND

1. Field of the Invention

The present disclosure relates to a liquid crystal display device, and more particularly, to a liquid crystal display (LCD) device for strengthening an adhesion between an upper ITO layer of color filter substrate and an electrostatic prevention means in a small-sized model having an in-plane switching (IPS) mode liquid crystal panel to prevent a ground fault.

2. Discussion of the Related Art

In today's information society, the importance of display devices is more emphasized as a visual information transmission medium, but their requirements such as low power consumption, thin profile, light weight, high picture quality should be satisfied in order to occupy the principal position in the future.

Display devices can be largely divided into an emissive type display capable of spontaneously emitting light such as cathode ray tube (CRT), electroluminescent (EL), light emitting diode (LED), vacuum fluorescent display (VFD), field emission display (FED), plasma display panel (PDP), and the like, and a non-emissive type display incapable of spontaneously emitting light such as liquid crystal display device.

The liquid crystal display is a device for expressing images using optical anisotropy of liquid crystal molecules, and in recent years, it is spotlighted as a second-generation device along with a PDP display because its visibility is more excellent than CRT, and its average power consumption and heat dissipation is lower than that of CRT with the same screen size.

Since liquid crystals used in the liquid crystal display device are not a light-emitting material, which spontaneously emits light, but a light-receiving material, which modulates an amount of light to display an image on the screen, and therefore, it is required to have a separate light source, namely, a backlight assembly for irradiating light to the liquid crystal panel.

Hereinafter, the liquid crystal display device will be described in detail.

If not particularly mentioned, a portion in which a lamp is placed is referred to as a lower portion, and a portion in which a liquid crystal panel is placed is referred to as an upper portion in a finished liquid crystal display device.

A liquid crystal display device may include a liquid crystal panel in which liquid crystal molecules are injected between an array substrate and a color filter substrate to output an image, a backlight assembly provided on a rear surface of the liquid crystal panel to emit light over an entire surface of the liquid crystal panel, and a plurality of case elements for fixing the liquid crystal panel to the backlight assembly to combine them with each other.

The backlight assembly functions to make a plane wave having a uniform luminance from the lamp that is used as a light source, and the backlight assembly can be largely divided into an edge type and a direct type based on a position of the light source with regard to the display surface thereof.

FIG. 1 is a cross-sectional view schematically illustrating a related art liquid crystal display device.

As illustrated in the drawing, a liquid crystal panel 10 configured by adhering an array substrate on which a plurality of pixels are formed in a matrix form to a color filter substrate on which R, G, and B filters are formed in a matrix form, is laminated with a backlight assembly to be accommodated into a support main 60.

Here, though not specifically shown in the drawing, at a side edge of the liquid crystal panel 10, a gate printed circuit board (PCB) for applying drive signals is connected to a gate pad of the liquid crystal panel 10 by interposing a gate taped carrier package (TCP) through a flexible cable.

Similarly, at the other side edge of the liquid crystal panel 10, a data PCB for applying graphic signals is connected to a data pad of the liquid crystal panel 10 through a flexible cable, and a data TCP for applying signals to the liquid crystal panel 10 based on a predetermined scanning method is adhered to them.

Furthermore, an upper polarizer 5 and a lower polarizer 15 are adhered to the upper and lower portions of the liquid crystal panel 10 respectively.

In a lower portion of the liquid crystal panel 10 having the foregoing configuration, it is laminated a backlight assembly including a plurality of optical sheets 43, a lamp (not shown) for generating light to express an image, a light guide plate 44 for converting light generated from the lamp into a plane wave to output it toward the liquid crystal panel 10 in the upper portion thereof, and a reflection sheet 45 for reflecting light leaked from the light guide plate 44 to enhance optical efficiency.

Here, the backlight assembly and the liquid crystal panel 10 are inserted into a support main 60 in a laminated form to protect them from an external shock as well as providing an optical alignment therebetween.

Furthermore, a top case 50 and a bottom case 55 are fastened to the support main 60 in which the liquid crystal panel 10 and the backlight assembly are accommodated.

Here, the top case 50 and bottom case 55 performs a role of grounding the PCB connected to the liquid crystal panel 10 and also performs a role of protecting the liquid crystal panel 10 and the backlight assembly.

On the other hand, in a related art in-plane switching (IPS) mode liquid crystal display device 1 having the foregoing configuration, an upper ITO 11 for discharging static electricity generated on a color filter substrate is formed at an upper portion of the liquid crystal panel 10.

Furthermore, in case of using a support main 60 mold structure, the upper ITO 11 is grounded to the bottom case 55 using a ground tape 70, and at this time it may cause quality failure due to weak grounding because an adhesion area of the ground tape 70 is small. In addition, there may exist a possibility that adhesion failure is caused due to such a small ground area when adhering the ground tape 70 thereto.

At this time, in case of increasing a thickness of the bottom case 55 in the arrow direction in order to secure an adhesion area of the ground tape 70 as illustrated in the drawing, it may cause a problem that an overall thickness of the liquid crystal display device 1 is also increased. In particular, in small-sized models under 5-inch, an increase of the thickness in the liquid crystal display device 1 may not meet the user's requirement for slimming liquid crystal display devices.

On the other hand, in case of fastening a liquid crystal panel to a backlight assembly using a guide panel, the upper ITO is grounded toward the guide panel which is a press part, and there may be a failure problem that the ground tape is detached after adhering to an adhesion portion of the upper ITO of the color filter substrate.

BRIEF SUMMARY

A liquid crystal display device may include a liquid crystal panel configured with a color filter substrate and an array substrate to display an image; a backlight assembly provided at a rear surface of the liquid crystal panel to supply light to the liquid crystal panel; a support main for accommodating and fixing the liquid crystal panel and the backlight assembly; a bottom cover fastened to the support main to include at least one bending portion in which part thereof is bent in a "C"-shape; and a electrostatic prevention means adhered to cover part of an upper ITO of the liquid crystal panel including the bending portion of the bottom cover.

As described above, according to a liquid crystal display device in accordance with the present invention, it may be possible to prevent electrostatic failure or the like through an effective grounding by securing a sufficient adhesion area of the ground tape. As a result, it provides an effect of enhancing the quality of the liquid crystal display device. In case of additionally adhering a touch screen panel thereto, it may be possible to prevent loosening failure by pressing the ground tape from an upper portion of the liquid crystal panel.

In addition, according to a liquid crystal display device in accordance with the present invention, it may not be required to increase a thickness of the bottom cover, thereby providing an effect of slimness and compactness.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Hereinafter, a liquid crystal display device according to preferred embodiments of the present invention will be described in detail with reference to the accompanying drawings.

Figure 1:
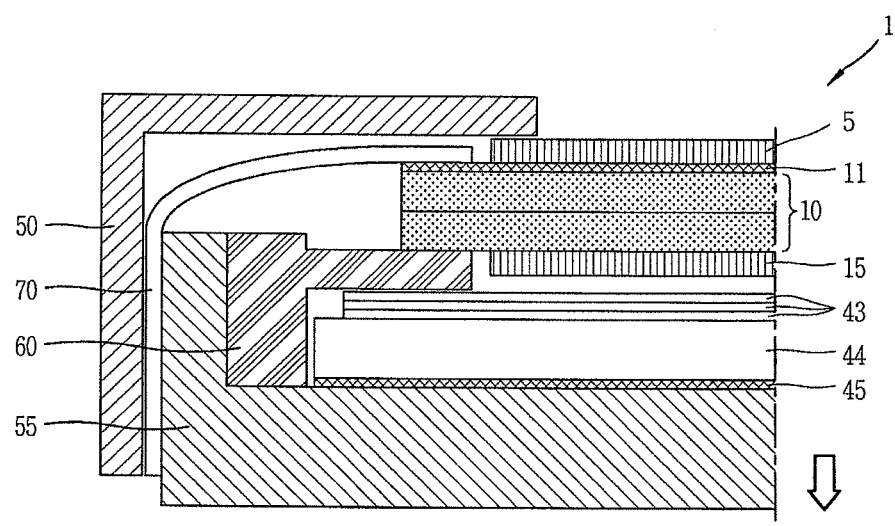
FIG. 1 is a cross-sectional view schematically illustrating a related art liquid crystal display device.
Figure 2:
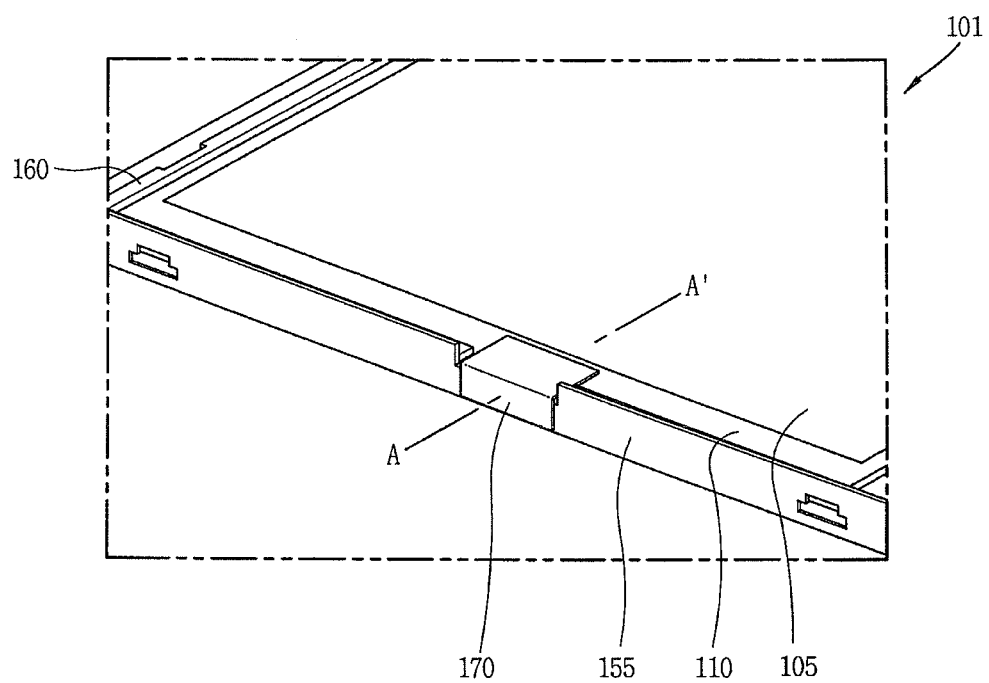
FIG. 2 is a cross-sectional view schematically illustrating a liquid crystal display device according to an embodiment of the present invention.
Figure 3:
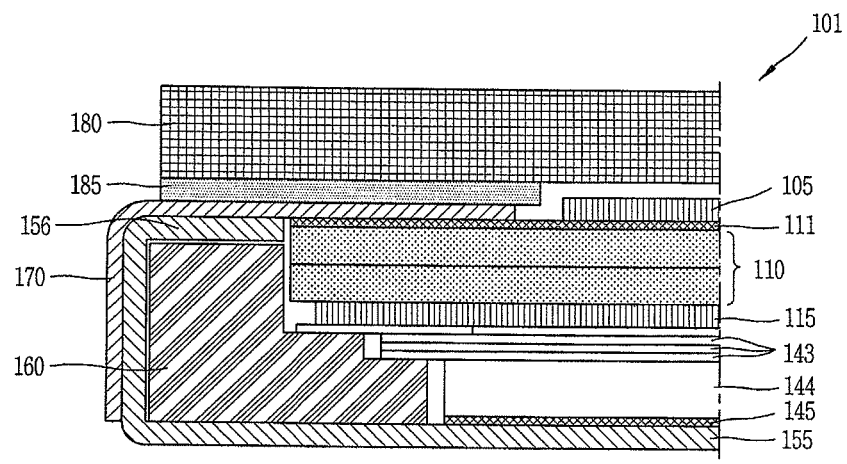
FIG. 3 is a view schematically illustrating a cross-section cut along the line of A-A' in a liquid crystal display device according to an embodiment of the present invention as illustrated in FIG. 2.

FIG. 2 is a cross-sectional view schematically illustrating a liquid crystal display device according to an embodiment of the present invention, and FIG. 3 is a view schematically illustrating a cross-section cut along the line of A-A' in a liquid crystal display device according to an embodiment of the present invention as illustrated in FIG. 2.

As illustrated in the drawing, a liquid crystal display device panel regions 101 according to an embodiment of the present invention may include a liquid crystal panel 110 for displaying an image, a backlight assembly provided at a rear surface of the liquid crystal panel 110 to supply light to the liquid crystal panel 110, and case elements, such as a support main 160 and a bottom cover 155, for accommodating and fixing the liquid crystal panel 110 and the backlight assembly.

At this time, though not specifically shown in the drawing, the liquid crystal panel 110 may largely include a color filter substrate and an array substrate, and a liquid crystal layer formed between the color filter substrate and the array substrate.

The color filter substrate may include a color filter configured with a plurality of sub-color filters for implementing red (R), green (G), and blue (B) colors, and a black matrix for dividing between the sub-color filters and blocking light passing through the liquid crystal layer, and the like.

Furthermore, the array substrate may include a plurality of gate lines and data lines arranged vertically and horizontally to define a plurality of pixel regions, thin-film transistors, i.e., switching elements, formed at each crossing region of the gate lines and the data lines, and pixel electrodes and common electrodes formed on the pixel regions.

Here, at a side edge of the liquid crystal panel 110, a gate PCB for applying drive signals is connected to a gate pad of the liquid crystal panel 10 by interposing a gate TCP through a flexible cable.

Similarly, at the other side edge of the liquid crystal panel 110, a data PCB for applying graphic signals is connected to a data pad of the liquid crystal panel 110 through a flexible cable, and a data TCP for applying signals to the liquid crystal panel 110 based on a predetermined scanning method is adhered to them.

Furthermore, an upper polarizer 105 and a lower polarizer 115 are adhered to the upper and lower portions of the liquid crystal panel 110 respectively.

In a lower portion of the liquid crystal panel 110 having the foregoing configuration, it is laminated a backlight assembly including a plurality of optical sheets 143, a lamp (not shown) for generating light to express an image, a light guide plate 144 for converting light generated from the lamp into a plane wave to output it toward the liquid crystal panel 110 in the upper portion thereof, and a reflection sheet 145 for reflecting light leaked from the light guide plate 144 to enhance optical efficiency.

Here, the backlight assembly and the liquid crystal panel 110 are inserted into a support main 160 in a laminated form to protect them from an external shock as well as providing an optical alignment therebetween.

Furthermore, a bottom case 155 is fastened to a lower portion of the support main 160 in which the liquid crystal panel 110 and the backlight assembly are accommodated. Here, the bottom case 155 performs a role of grounding the PCB connected to the liquid crystal panel 110 and also performs a role of protecting the liquid crystal panel 110 and the backlight assembly.

Here, the bottom case 155 includes at least one bending portion 156 in which part thereof is bent in a "C"-shape, and the bending portion 156 of the bottom cover 155 is bent in a "C"-shape toward the liquid crystal panel 110 and an end thereof is safely arrived at an upper portion of the support main 160, thereby securing a space for adhering an upper indium tin oxide (ITO) 111 of the color filter substrate and an electrostatic prevention means 170, and as a result, it may be possible to strengthen an adhesive force of an electrostatic prevention means 170 without increasing a thickness of the liquid crystal display device 101.

The electrostatic prevention means 170 may be made of a conductive tape capable of being adhered to a surface, and the liquid crystal display device 101 adhered with the electrostatic prevention means 170 may be used for an in-plane switching mode in which electrodes are arranged on an array substrate.

Here, the upper ITO 110 grounded to the bottom cover 155 by the electrostatic prevention means 170 is formed at a rear surface the color filter substrate to perform a role of discharging static electricity generated on the color filter substrate to the outside.

In particular, according to an liquid crystal display device 101 according to an embodiment of the present invention, in a small-sized model under 5-inch having an in-plane switching (IPS) mode liquid crystal panel 110, it may be possible to strengthen an adhesive force of an electrostatic prevention means 170 without increasing a thickness of the liquid crystal display device, thereby preventing electrostatic failure or the like through an effective grounding. As a result, it may be possible to provide an effect of enhancing the quality of the liquid crystal display device 101, and it may be also possible to prevent loosening failure by pressing the electrostatic prevention means 170 from an upper portion of the liquid crystal panel 110 in case of additionally adhering a touch screen panel thereto. For reference, reference numeral 185 represents an adhesive tape for adhering the touch screen panel 180.

In addition, in a liquid crystal display device 101 according to an embodiment of the present invention, it is not required to increase a thickness of the bottom cover 155, thereby providing an effect of slimness and compactness.

Hereinafter, a fastening process of a liquid crystal display device having the foregoing configuration according to an embodiment of the present invention will be described in detail with reference to the drawings.

Figure 4A:
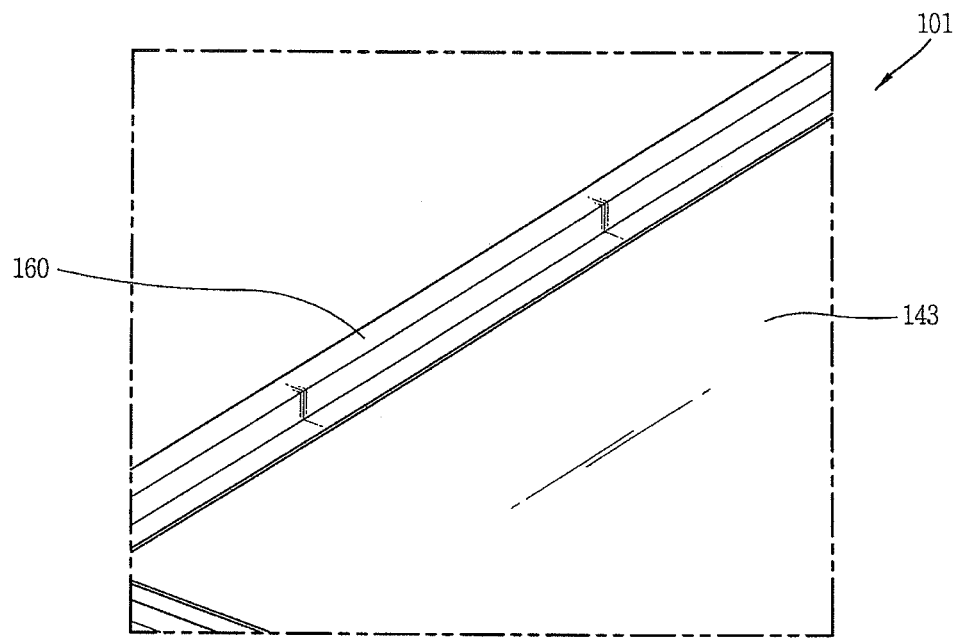
FIGS. 4A through 4E are perspective views sequentially illustrating a fastening process in a liquid crystal display device according to an embodiment of the present invention.
Figure 4B:
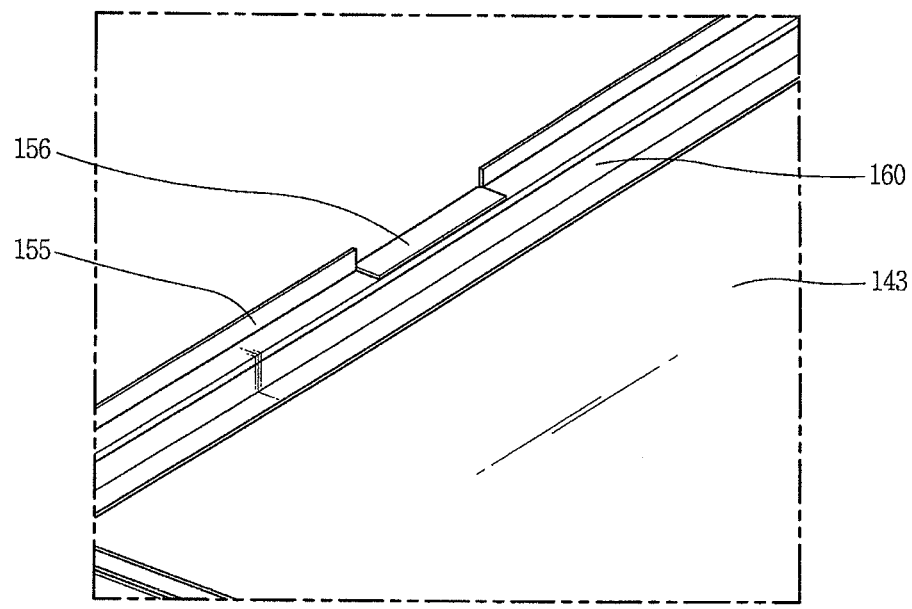
Figure 4C:
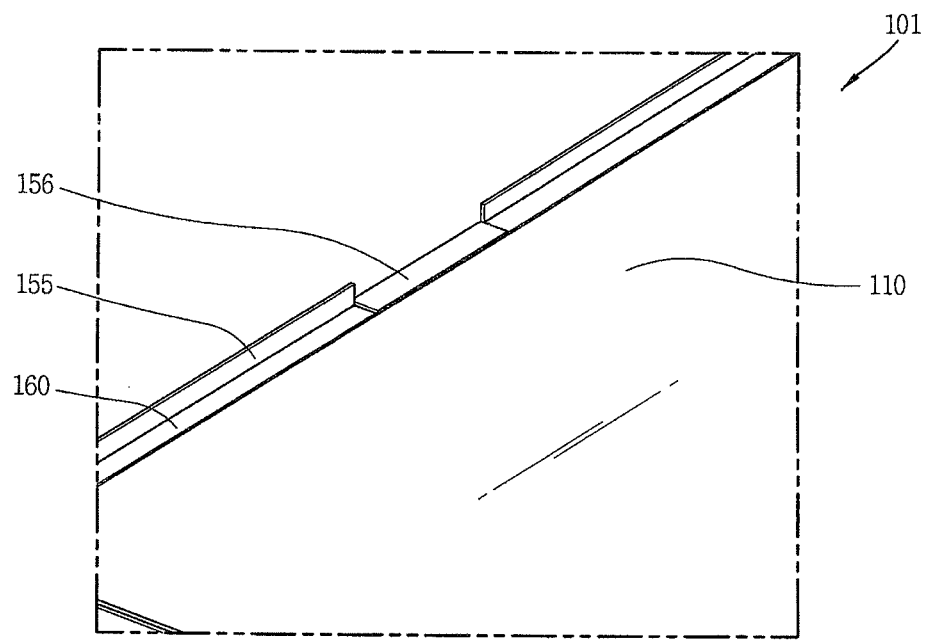
Figure 4D:
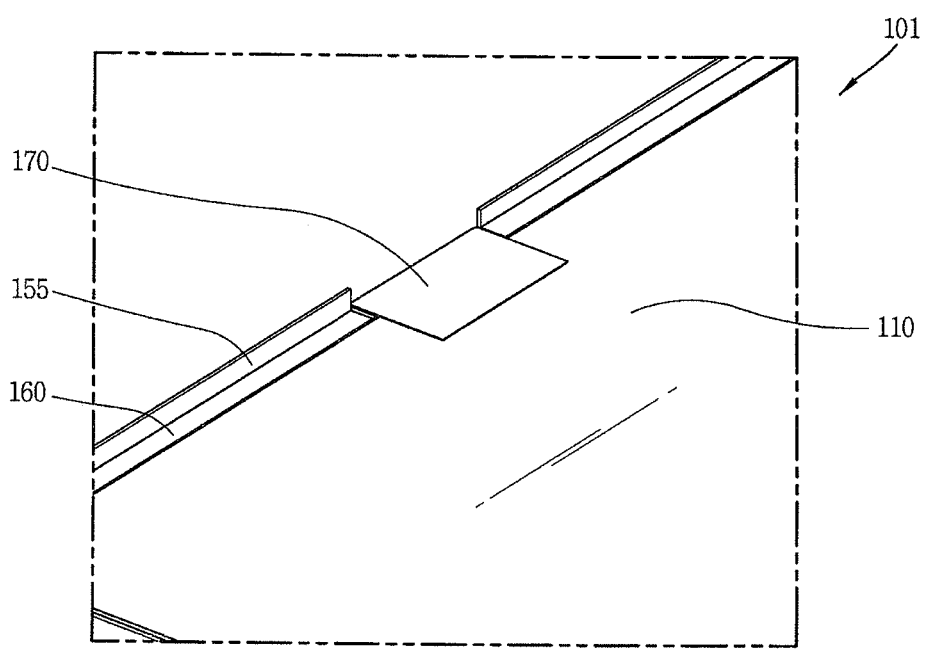
Figure 4E:
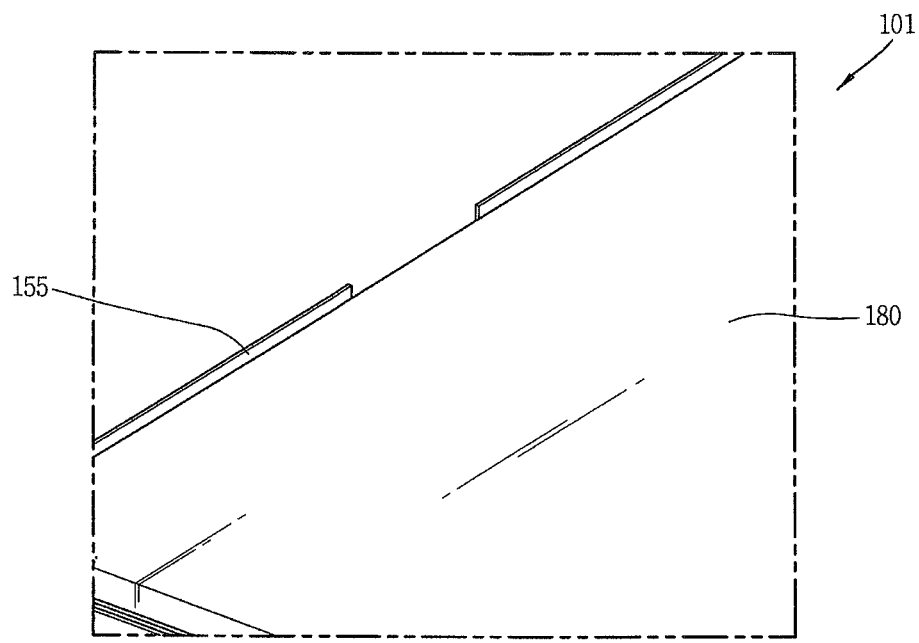
Figure 5:
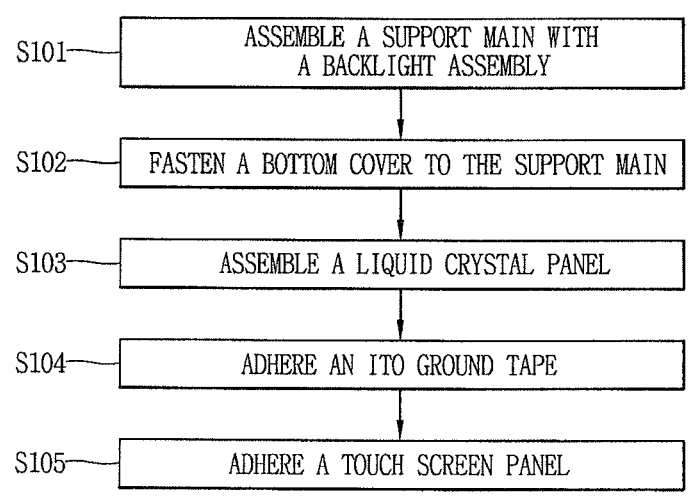
FIG. 5 is a flow chart schematically illustrating a fastening process in a liquid crystal display device according to an embodiment of the present invention.

FIGS. 4A through 4E are perspective views sequentially illustrating a fastening process in a liquid crystal display device according to an embodiment of the present invention, and FIG. 5 is a flow chart schematically illustrating a fastening process in a liquid crystal display device according to an embodiment of the present invention.

As illustrated in FIG. 4A, a backlight assembly including a plurality of optical sheets 143, a lamp (not shown) for generating light to express an image, a light guide plate (not shown) for converting light generated from the lamp into a plane wave to output it toward the liquid crystal panel in the upper portion thereof, and a reflection sheet (not shown) for reflecting light leaked from the light guide plate to enhance optical efficiency is sequentially accommodated in the support main 160 which is a mold structure (S101).

Furthermore, as illustrated in FIG. 4B, the bottom case 155 including at least one bending portion 156 in which part thereof is bent in a "C"-shape is fastened to a support main 160 in which the backlight assembly is accommodated (S102). The bending portion 156 of the bottom cover 155 is bent in a "C"-shape toward an inner side of the support main 160 and safely arrived at an upper portion of the support main 160.

Subsequently, as illustrated in FIG. 4C, a liquid crystal panel 110 including an upper ITO (not shown) is assembled to the support main 160 being fastened with the bottom case 155 (S103).

Here, a fabrication process of the liquid crystal panel can be largely classified into a drive element array process for forming drive elements on a lower array substrate, a color filter process for forming color filters, and a cell process.

First, a plurality of gate lines and data lines arranged on a lower substrate to define pixel regions are formed, and thin-film transistors, i.e., switching elements, which are connected to the gate lines and data lines on each of the pixel regions are formed by the array process. Also, pixel electrodes connected to the thin-film transistors to drive a liquid crystal layer by applying signals through the thin-film transistors are formed through the array process.

Furthermore, a color filter layer configured with sub-color filters of red, green, and blue, and a black matrix, and a common electrode are formed by the color filter process on an upper substrate. At this time, in case of fabricating a in-plane switching mode liquid crystal display device, the common electrode is formed on a lower substrate, which is formed with the pixel electrodes, through the array process.

Subsequently, alignment layers are printed on the upper and lower substrates respectively, and then the alignment layers are rubbed to provide anchoring force or surface fixation force (i.e., a pre-tilt angle and an alignment direction) to the liquid crystal molecules of the liquid crystal layer formed between the upper substrate and the lower substrate.

Then, after finishing an alignment inspection, a predetermined seal pattern is formed on the color filter substrate using a sealant and at the same time a liquid crystal layer is formed on the array substrate.

According to a liquid crystal panel 110 fabricated in this manner, an upper ITO for discharging static electricity generated on the color filter substrate to the outside is formed at a rear surface of the color filter substrate, and an upper polarizer (not shown) and a lower polarizer (not shown) are adhered to the upper and lower portions of the liquid crystal panel 110 respectively.

Next, as illustrated in FIG. 4D, an electrostatic prevention means 170 such as a conductive tape is adhered to cover part of the upper ITO of the liquid crystal panel 110 including the bending portion 156 of the bottom cover 155 (S104). At this time, as described above, the bending portion 156 of the bottom cover 155 is bent in a "C"-shape toward the liquid crystal panel 110 and safely arrived at an upper portion of the support main 160, thereby securing a space for adhering an upper ITO of the color filter substrate and an electrostatic prevention means 170, and as a result, it is possible to strengthen an adhesive force of the electrostatic prevention means 170 without increasing a thickness of the liquid crystal display device 101.

Furthermore, in case of adding a touch screen panel thereto, as illustrated in FIG. 4E, a touch screen panel 180 is adhered to an upper surface of the liquid crystal panel 110 to press the electrostatic prevention means 170 from an upper portion of the liquid crystal panel 110 (S105).

Although many subject matters have been specifically disclosed in the foregoing description, they should be construed as an illustration of preferred embodiments rather than a limitation to the scope of invention. Consequently, the invention should not be determined by the embodiments disclosed herein but should be determined by the claims and the equivalents thereof.

The invention claimed is:

1. A liquid crystal display device, comprising:
   a liquid crystal panel configured with a color filter substrate and an array substrate to display an image;
   a backlight assembly provided at a rear surface of the liquid crystal panel to supply light to the liquid crystal panel, wherein the backlight assembly and the liquid crystal panel are inserted into a support main in a laminated form;

a bottom cover fastened to lower and side portions of the support main in which the backlight assembly and the liquid crystal panel are accommodated, wherein the bottom cover is "L"-shape except at at least one bending portion at a middle region forming a "C"-shape, and wherein the bending portion of the bottom cover is bent in a "C"-shape toward the liquid crystal panel and an end thereof is on an upper portion of the support main;

an electrostatic prevention means adhered to cover part of an upper ITO (indium tin oxide) layer of the liquid crystal panel and the bending portion of the bottom cover; and a touch screen panel adhered to a front surface of the liquid crystal panel and the electrostatic prevention means using an adhesive tape by pressing the electrostatic prevention means from an upper portion of the liquid crystal panel.

2. The liquid crystal display device of claim 1, wherein the support main which is a mold structure sequentially accommodates a backlight assembly including a plurality of optical sheets, a lamp for generating light to express an image, a light guide plate for converting light generated from the lamp into a plane wave to output it toward the liquid crystal panel in the upper portion thereof, and a reflection sheet for reflecting light leaked from the light guide plate to enhance optical efficiency.

3. The liquid crystal display device of claim 1, wherein the electrostatic prevention means comprises a conductive tape capable of being adhered to a surface.

4. The liquid crystal display device of claim 1, wherein the liquid crystal panel adhered with the electrostatic prevention means comprises an in-plane switching mode in which electrodes are arranged on an array substrate.

5. The liquid crystal display device of claim 1, wherein the upper ITO grounded to the bottom cover by the electrostatic prevention means discharges static electricity generated on the color filter substrate to the outside.

\* \* \* \* \*